US011185198B2

(12) United States Patent
Hoffman et al.

(10) Patent No.: US 11,185,198 B2
(45) Date of Patent: Nov. 30, 2021

(54) BLOWERS WITH VARIABLE NOZZLES (71) Applicant: TTI (MACAO COMMERCIAL OFFSHORE) LIMITED

(72) Inventors: Ronald J. Hoffman, Iva, SC (US); Christopher A. Holman, Clemson, SC (US); Eric Nolin, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 224 days.

(21) Appl. No.: 16/379,281

(22) Filed: Apr. 9, 2019

(65) Prior Publication Data
US 2019/0335964 A1 Nov. 7, 2019

Related U.S. Application Data (60) Provisional application No. 62/665,797, filed on May 2, 2018.

(51) Int. Cl.
*A47L 5/24* (2006.01)
*A47L 5/28* (2006.01)
*A01G 20/47* (2018.01)

(52) U.S. Cl.
CPC ...... *A47L 5/24* (2013.01); *A47L 5/28* (2013.01); *A01G 20/47* (2018.02)

(58) Field of Classification Search
CPC ... A01G 20/47; A47L 5/24; A47L 5/28; A47L 9/2878; E01H 1/0809; F04D 25/084; B05B 1/005; B05B 1/30
See application file for complete search history.

(56) References Cited

U.S. PATENT DOCUMENTS

| | | | | |
|---|---|---|---|---|
| 4,884,314 A | * | 12/1989 | Miner | A47L 5/14 15/344 |
| 5,950,276 A | * | 9/1999 | Everts | A47L 5/14 15/405 |
| 2015/0237808 A1 | * | 8/2015 | Prager | A47L 5/14 15/405 |
| 2015/0366424 A1 | * | 12/2015 | Naka | E01H 1/0809 239/590.5 |

(Continued)

FOREIGN PATENT DOCUMENTS

| | | | | |
|---|---|---|---|---|
| CA | 2958180 A1 | * | 8/2017 | ............... B08B 5/02 |
| JP | 2014/098320 A | | 5/2014 | |
| JP | 2014098320 A | * | 5/2014 | |

OTHER PUBLICATIONS

TTI (MACAO Commercial Offshore) Limited; European Patent Application No. EP19172288; Extended European Search Report; dated Oct. 1, 2019; (2 pages).

*Primary Examiner* — Marc Carlson
(74) *Attorney, Agent, or Firm* — Dority & Manning, P.A (57) ABSTRACT

A blower includes a main body which includes a housing and a fan disposed in the housing. The housing further defines an air discharge opening. The blower further includes an extension tube connected to the air discharge opening, the extension tube extending between a first end connected to the air discharge opening and a second end. The blower further includes a variable nozzle, the variable nozzle including a plurality of adjustable air control surfaces. The blower further includes a nozzle adjustment tube connected to the second end of the extension tube and at least partially surrounding the variable nozzle.

19 Claims, 7 Drawing Sheets

(56) References Cited

U.S. PATENT DOCUMENTS

2017/0231163 A1\* 8/2017 Nolin ........................ B08B 5/02
                                                                              15/405
2020/0305360 A1\* 10/2020 Lhoste-Clos ......... E01H 1/0809

\* cited by examiner

BLOWERS WITH VARIABLE NOZZLES

This application claims the benefit of priority to U.S. Provisional Patent Application No. 62/665,797, filed on May 2, 2018, the disclosure of which is incorporated by reference herein in its entirety.

FIELD

The present disclosure relates generally to blowers, and more particularly to blowers with variable nozzles for adjusting the velocity and pressure of air flowing therethrough.

BACKGROUND

Portable hand-held blowers are popular for, for example, home maintenance and commercial landscaping tasks. Typical hand-held blowers are either powered by gasoline engines or electric motors. A fan is connected to the motor or engine and rotates within a blower housing. The fan generates an air flow that is directed towards an outlet of the housing. An extension tube is generally connected to the outlet of the housing to direct the air flow from the housing therethrough, and the air flow is then exhausted from the tube or through a nozzle connected to the tube.

In many cases it is advantageous for a user to adjust the velocity and pressure of the exhausted air flow. Many known blowers simply achieve higher velocity/pressure at the outlet by increasing fan speed. However, increasing the fan speed is not always desirable, as the corresponding increase in engine or motor speed can result in reduced operating times and efficiency. In some cases, known blowers offer multiple separate interchangeable nozzles, with each nozzle having a differently sized exhaust outlet. However, adjusting the velocity and pressure in these cases involves manually removing one nozzle and attaching a different nozzle, which can be a tedious process. Further, there is a risk of one or more of these nozzles being misplaced and lost.

Accordingly, improved apparatus for adjusting blower air flow velocity and pressure is desired.

BRIEF DESCRIPTION

Aspects and advantages of the invention will be set forth in part in the following description, or may be obvious from the description, or may be learned through practice of the invention.

In one embodiment, a blower is provided. The blower includes a main body which includes a housing and a fan disposed in the housing. The housing further defines an air discharge opening. The blower further includes an extension tube connected to the air discharge opening, the extension tube extending between a first end connected to the air discharge opening and a second end. The blower further includes a variable nozzle, the variable nozzle including a plurality of adjustable air control surfaces. The blower further includes a nozzle adjustment tube connected to the second end of the extension tube and at least partially surrounding the variable nozzle. Rotation of the nozzle adjustment tube about a longitudinal axis causes movement of the air control surfaces between a first position and a second position.

In accordance with another embodiment, a blower is provided. The blower includes a main body which includes a housing and a fan disposed in the housing. The housing further defines an air discharge opening. The blower further includes an extension tube connected to the air discharge opening, the extension tube extending between a first end connected to the air discharge opening and a second end. The blower further includes a variable nozzle, the variable nozzle including a plurality of adjustable air control surfaces. Each of the plurality of air control surfaces comprises an exterior raised cam surface. The blower further includes a nozzle adjustment tube connected to the second end of the extension tube and at least partially surrounding the variable nozzle. The nozzle adjustment tube includes one or more interior raised cam surfaces. Movement of the one or more interior raised cam surfaces relative to the exterior raised cam surfaces along a longitudinal axis causes movement of the air control surfaces between a first position and the second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 11, embodiments of blowers 10 in accordance with the present disclosure are illustrated. Blowers 10 in accordance with the present disclosure advantageously include variable nozzles. Each variable nozzle includes a plurality of adjustable air control surfaces. For example, the air control surfaces are movable between a first position and a second position. A distal end opening diameter defined by the air control surfaces in the first position is greater than a distal end opening diameter of the air control surfaces in the second position. Accordingly, as the air control surfaces are moved between the first and second positions, the velocity and pressure of air flowing through the distal end opening defined by the air control surfaces is adjusted. As the air control surfaces are moved from the first position towards the second position, the velocity and pressure is increased, and as the air control surfaces are moved from the second position to the first position, the velocity and pressure is decreased. Advantageously, no adjustment in the fan speed of the blower is required for such velocity and pressure adjustments.

Adjustment of the variable nozzle in accordance with the present disclosure is advantageously simple and efficient. For example, blowers in accordance with the present disclosure may include an extension tube and a nozzle adjustment tube. Movement of the nozzle adjustment tube, such as rotation thereof, may cause movement of the air control surfaces between the first and second positions. For example, in exemplary embodiments, a user may simply twist the nozzle adjustment tube relative to the extension tube, and such movement may cause the desired movement of the air control surfaces.

Figure 1:
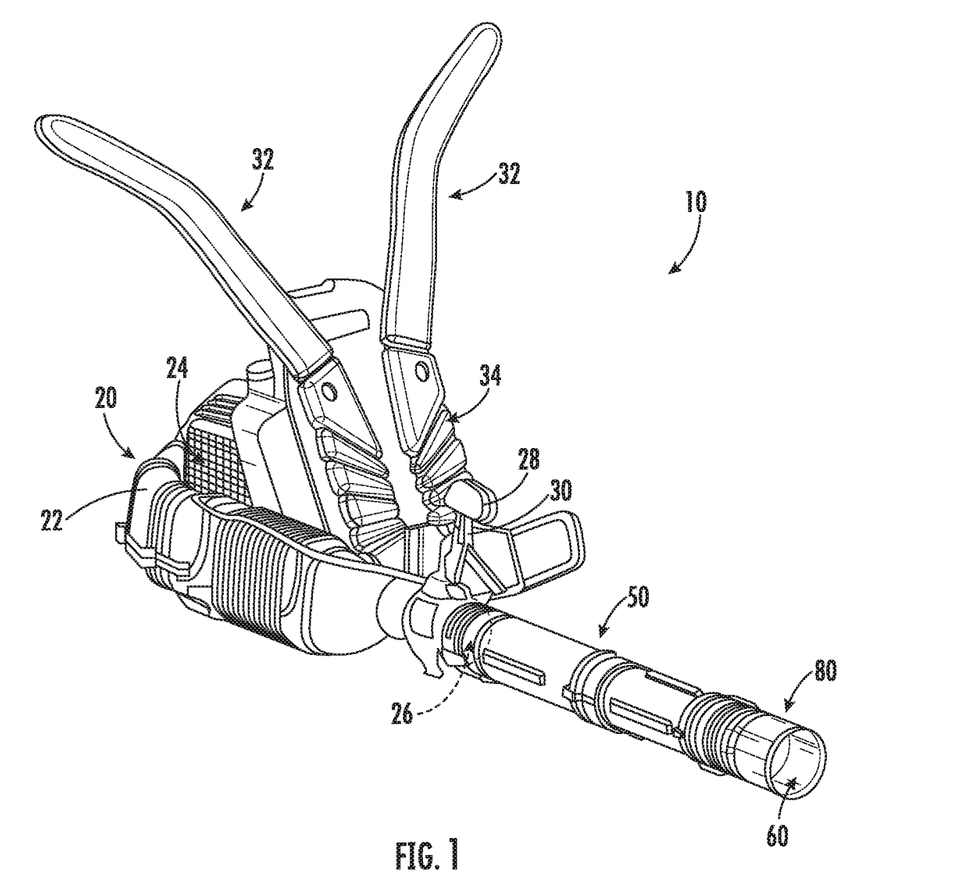
FIG. 1 is a perspective view of a blower in accordance with embodiments of the present disclosure.
Figure 2:
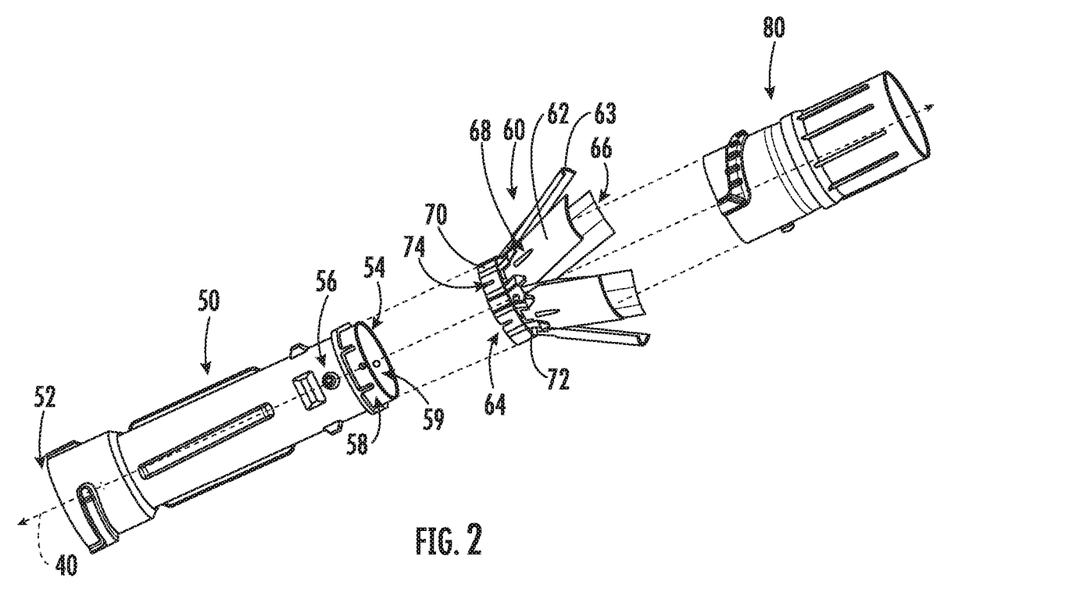
FIG. 2 is an exploded perspective view of an extension tube, variable nozzle, and nozzle adjustment tube of a blower in accordance with embodiments of the present disclosure.

Referring now to FIG. 1, one embodiment of a blower 10 is provided. As shown, blower 10 may include a main body 20. Main body 20 may include a housing 22 and a fan 24 disposed in the housing 22. Operation of the fan 24 may generate an airflow which may flow from the main body 20 through an air discharge opening 26 defined in the housing 22.

Blower 10 may be a gas-powered, electric, or other suitably powered handheld blower 10. In some embodiments, for example, an electrically-powered motor may be provided in main body 20. The electrically-powered motor may be powered by electricity from an electrical socket via an electrical cord of the blower 10, or may be battery-powered and utilize a battery in communication with the motor. Alternatively, a gas-powered engine may be provided. The motor or engine of the blower 10 may be connected to the fan 24, such that the fan 24 is rotatably driven by the motor or engine.

In some embodiments, the fan 24 may be an axial fan. Alternatively, fan 24 may be a non-axial fan.

As discussed, blowers 10 in accordance with the present disclosure are handheld blowers. Accordingly, in exemplary embodiments, a blower 10 may include a handle 28 for a user to grip when utilizing the blower 10. A trigger 30 may, for example, be provided on the handle 28. Actuating the trigger 30 may cause operation of the motor or engine, and/or may increase the speed of the fan 24.

Further, in some embodiments, straps 32 and a backplate 34 may be provided on the blower 10. A user may thus utilize the blower as a "backpack" style blower.

Referring again to FIGS. 1 through 11, a blower 10 in accordance with the present disclosure may further include various components that generally direct the air flow away from the main body 20. The direction of air flow through such components may be generally along a longitudinal axis 40 defined by such components.

For example, as illustrated in FIGS. 1, 2, 5, and 7-9, blower 10 may include an extension tube 50. The extension tube 50 may extend, such as along the longitudinal axis 40, between a first end 52 and a second end 54. The first end 52 may be connected to housing 22 and air discharge opening 26 thereof, such that air flowing through the air discharge opening 26 flows into the extension tube 50 through the first end 52 thereof. Notably, extension tube 50 may be a singular tube 50 or include two or more tube sections which are connected together.

Figure 5:
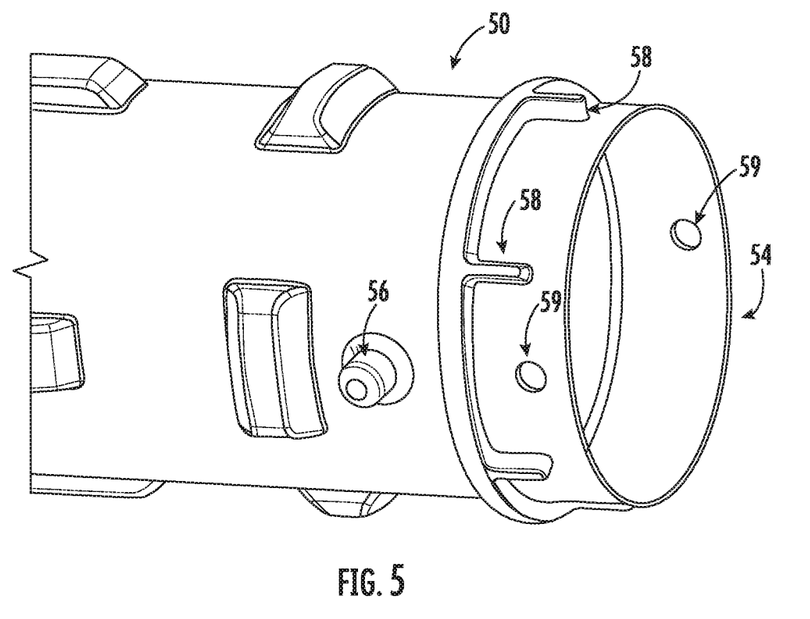
FIG. 5 is a perspective view of an end portion of an extension tube in accordance with embodiments of the present disclosure.

In some embodiments, the extension tube 50 may include one or more posts 56, which may be provided on the exterior thereof as shown or on the interior thereof. For example, in exemplary embodiments, two posts 56 may be provided. The posts 56 may, for example, be disposed proximate the second end 54 and thus distal from the first end 52 (relative to the second end 54). Each post 56 may serve as a guide for a track of a nozzle adjustment tube, as discussed herein.

Additionally or alternatively, the extension tube 50 may include one or more keys 58. Keys 58 may be disposed proximate the second end 54, and may be provided on the exterior of the extension tube 50 as shown or on the interior. The keys 58 may, for example, mate with corresponding keyways of a variable nozzle, as discussed herein.

Additionally or alternatively, one or more lock apertures 59 may be defined in the extension tube 50. Lock apertures 59 may, for example, be disposed proximate the second end 54. Each lock aperture 59 may extend entirely or partially through the extension tube 50, such as from the interior towards the exterior or from the exterior towards the interior. The lock apertures 59 may, for example, mate with corresponding lock members of a variable nozzle, as discussed herein.

As illustrated in FIGS. 1-4 and 7-11, a blower 10 in accordance with the present disclosure further includes a variable nozzle 60. Variable nozzle 60 may include a plurality of adjustable air control surfaces 62, each of which is movable between a first position and a second position. The variable nozzle 60 may, for example, be connected to the second end 54 of the extension tube 50. Air flowing through the extension tube 50 from the first end 52 towards the second end 54 may exit the extension tube 50 through the second end 54 into the variable nozzle 60.

Figure 9:
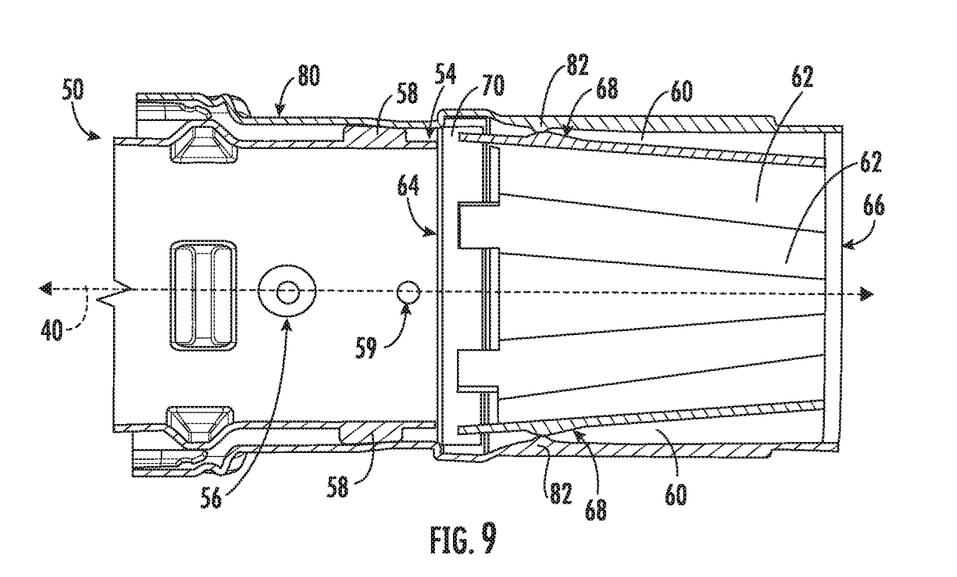
FIG. 9 is an assembled cross-sectional view of an extension tube, variable nozzle, and nozzle adjustment tube of a blower, with the variable nozzle in a second position, in accordance with embodiments of the present disclosure.
Figure 10:
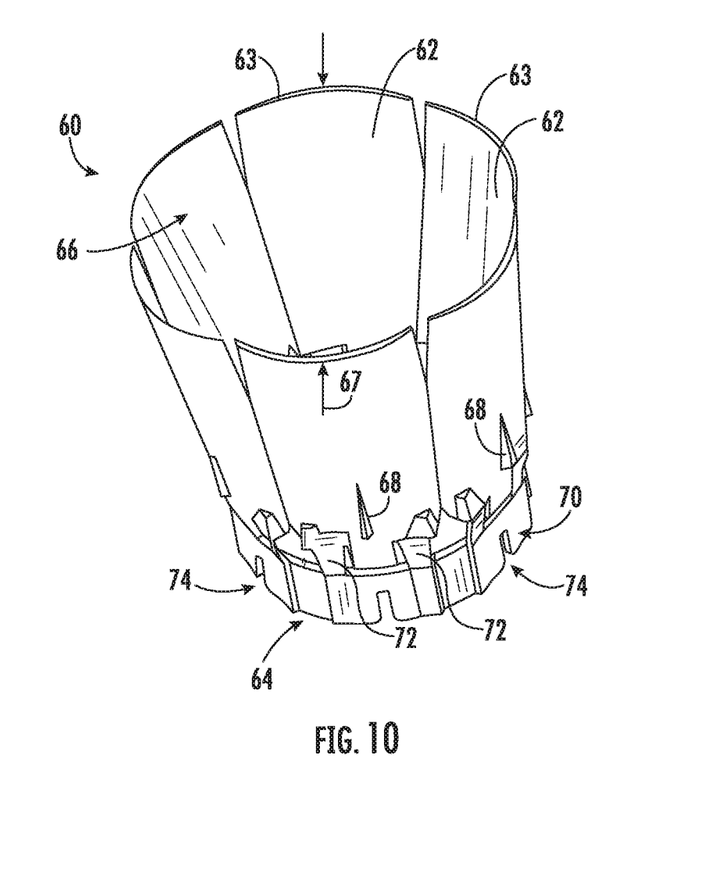
FIG. 10 is a perspective view illustrating a first position of the variable nozzle in accordance with embodiments of the present disclosure.
Figure 11:
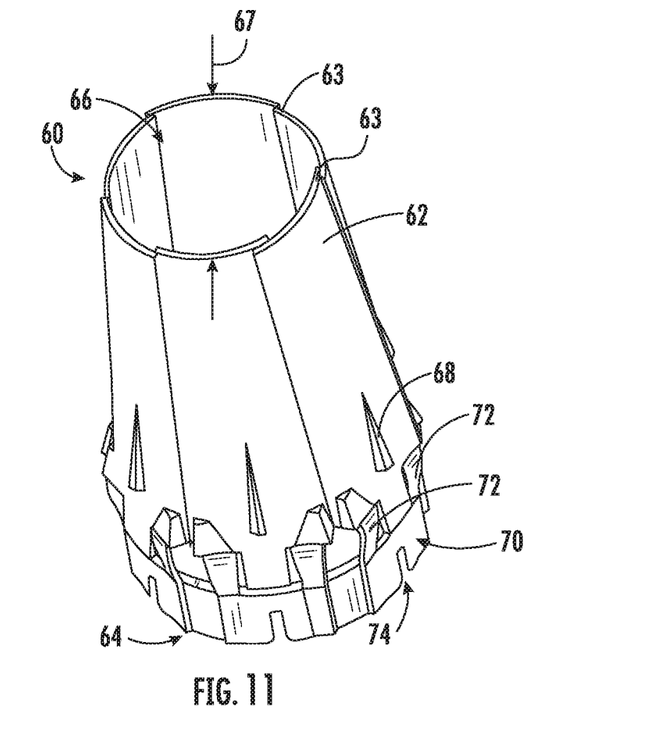
FIG. 11 is a perspective view illustrating a second position of the variable nozzle in accordance with embodiments of the present disclosure.

As discussed, the air control surfaces 62 may be movable between a first position (FIGS. 7, 8, and 10) and a second position (FIGS. 9 and 11). For example, the variable nozzle 60 may extend between a proximal end opening 64 which may connect to the extension tube 50 and a distal end opening 66 which is defined by distal tips 63 of the air control surface 62. A distal end opening diameter 67 may be defined by the distal tips 63 at the distal end opening 66. The distal end opening diameter 67 in the first position is greater than the distal end opening diameter 67 in the second position.

Figure 3:
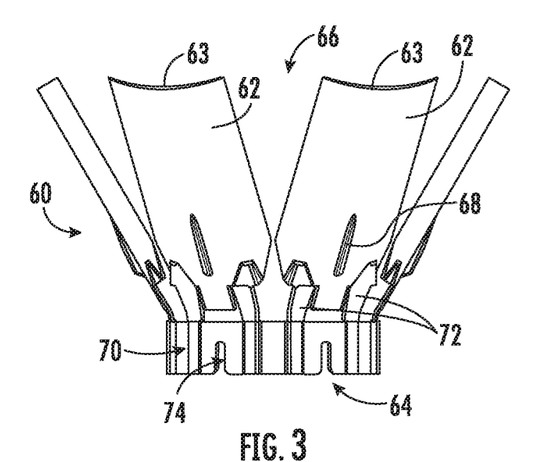
FIG. 3 is a side view of a variable nozzle in accordance with embodiments of the present disclosure.
Figure 4:
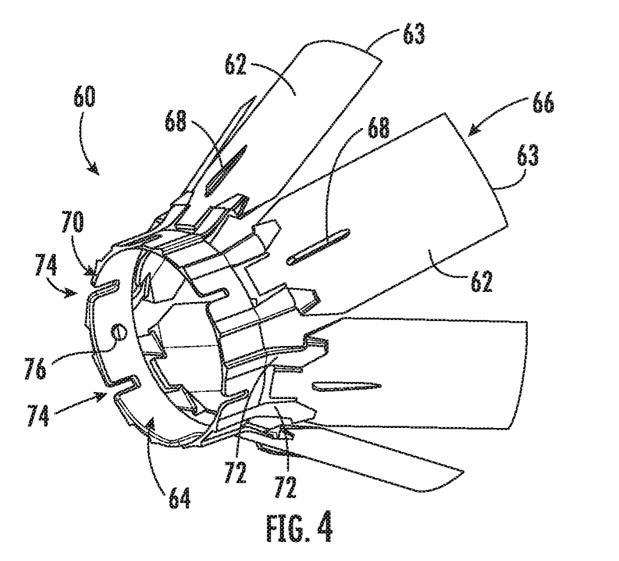
FIG. 4 is a perspective view of a variable nozzle in accordance with embodiments of the present disclosure.

Each air control surface 62 may further include a raised cam surface 68 on an exterior thereof. Each raised cam surface 68 may, for example, be a ramp extending from the exterior of the air control surface 62. In some embodiments as shown, for example, each raised cam surface 68 may taper downwards towards the exterior of the air control surface 62 in a direction along the longitudinal axis 40 from the proximal end opening 64 towards the distal end opening 66. Each raised cam surface 68 may interact with a corresponding raised cam surface of a nozzle adjustment tube as discussed herein to cause movement of the air control surfaces 62 between the first and second positions.

In exemplary embodiments, the air control surfaces 62 may be disposed in an annular array about the longitudinal axis 40. Further, a circumferential axis may be defined by the variable nozzle 60, and may be perpendicular to the longitudinal axis 40. The annular array may be defined about this axis. Each air control surface 62 may be rotatable about the circumferential axis between the first and second positions.

Each air control surface 62 may have a curvilinear cross-sectional profile. Further, in some embodiments, each air control surface 62 may be formed from a suitable polymer, such as a suitable thermoplastic polymer. Particular examples of suitable materials may include polyolefins, such as polypropylene; polyamides, such as nylon; polyacetals, such as polyoxymethylene; or styrene polymers, such as ABS or polystyrene. Alternatively, however, other suitable materials may be utilized. In some embodiments, the material utilized to form the air control surfaces 62 may be a flexible material.

In some embodiments, variable nozzle 60 may further include a retaining ring 70. The retaining ring 70 may be disposed at and define the proximal end opening 64. Further, the retaining ring 70 may define the circumferential axis. Each of the plurality of air control surfaces 62 may be connected to the retaining ring 70, and may be rotatable relative to the retaining ring 70 between the first position and the second position.

In some embodiments, as shown, one or more leaf springs 72 may connect each air control surface 62 to the retaining ring 70. The leaf springs 72 may be integrally formed with the corresponding air control surfaces 62 and retaining ring 70 such that the components are a single, unitary structure, or the components may be separately formed and connected together.

The retaining ring 70 may connect the variable nozzle 60 to the extension tube 50. For example, the retaining ring 70 may generally slide over and onto the extension tube 50 at the second end 54 thereof. In some embodiments, retaining ring 70 may further define one or more keyways 74. Each keyway 74 may mate with a corresponding key 58 of the extension tube 50, such that the key 58 is inserted in the keyway 74. Such mating may locate and orient the variable nozzle 60 relative to the extension tube 50, and may prevent rotation of the variable nozzle 60 relative to the extension tube 50 about the longitudinal axis 40. Additionally or alternatively, one or more lock members 76 may protrude from the retaining ring 70, such as from an interior thereof as shown or an exterior. Each lock member 76 may mate with a corresponding lock aperture 59 defined in the extension tube 50, such that the lock members 76 are inserted in the lock apertures 59. Such mating may securely connect the variable nozzle 60 to the extension tube 50.

As illustrated in FIGS. 1, 2, 6, and 7-9, blower 10 may further include a nozzle adjustment tube 80. Nozzle adjustment tube 80 may be connected to the second end 54 of the extension tube 50. The nozzle adjustment tube 80 may at least partially, and in exemplary embodiments fully, surround the variable nozzle 60. Movement of the nozzle adjustment tube 80 may cause movement of the air control surfaces 62 between the first and second positions. For example, in some embodiments, rotation of the nozzle adjustment tube 80 about the longitudinal axis 40 causes movement of the air control surfaces 62 between the first position and a second position. Additionally or alternatively, sliding of the nozzle adjustment tube 80 along the longitudinal axis 40 causes movement of the air control surfaces 62 between the first position and second position. In exemplary embodiments, rotation of the nozzle adjustment tube 80 about the longitudinal axis 40 may cause sliding of the nozzle adjustment tube 80 along the longitudinal axis 40, which may in turn cause movement of the air control surfaces 62 between the first position and second position.

Figure 6:
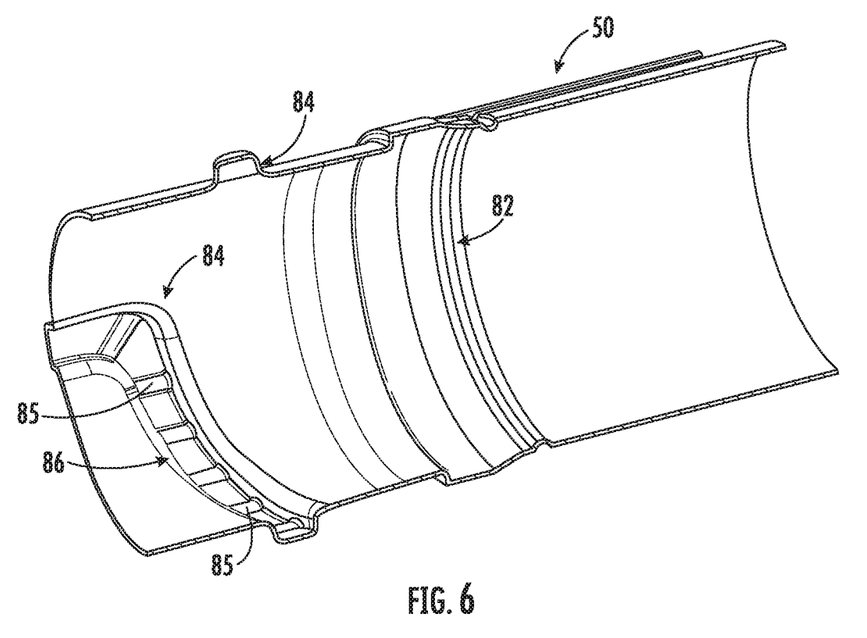
FIG. 6 is a cross-sectional view of a nozzle adjustment tube in accordance with embodiments of the present disclosure.

For example, the nozzle adjustment tube 80 may include one or more raised cam surfaces 82 disposed on an interior thereof. The raised cam surface(s) 82 may, for example, be a ring or a plurality of raised surfaces in an annular array protruding from the interior of the nozzle adjustment tube 80. The raised cam surface(s) 82 may interact with the raised cam surfaces 68 of the variable nozzle 60 to cause movement of the air control surfaces 62 between the first and second positions. For example, the raised cam surface(s) 82 may contact the raised cam surfaces 68. Movement of the raised cam surface(s) 82 relative to the raised cam surfaces 68 may cause movement of the air control surfaces 62 between the first and second positions. In exemplary embodiments, such movement of the raised cam surface(s) 82 may be along the longitudinal axis 40. For example, as discussed, each raised cam surface 68 may be in the form of a tapered rail. As the nozzle adjustment tube 80, and thus the raised cam surface(s) 82, are moved along the longitudinal axis 40 in a first direction (such as towards the extension tube 50) along the longitudinal axis 40, the raised cam surface(s) 82 may ride up the raised cam surfaces 68, thus pushing the raised cam surfaces 68 and associated air control surfaces 62 inwards and causing movement thereof in a direction from the first position towards the second position. As the nozzle adjustment tube 80, and thus the raised cam surface(s) 82, are moved along the longitudinal axis 40 in a second opposite direction (such as away from the extension tube 50) along the longitudinal axis 40, the raised cam surface(s) 82 may ride down the raised cam surfaces 68, thus allowing the raised cam surfaces 68 and associated air control surfaces 62 to move outwards and causing movement thereof in a direction from the second position towards the first position. In some embodiments, such movement of the air control surfaces 62 from the second position to the first position may further be caused by a spring bias (such as from leaf springs 72) towards the first position.

Figure 7:
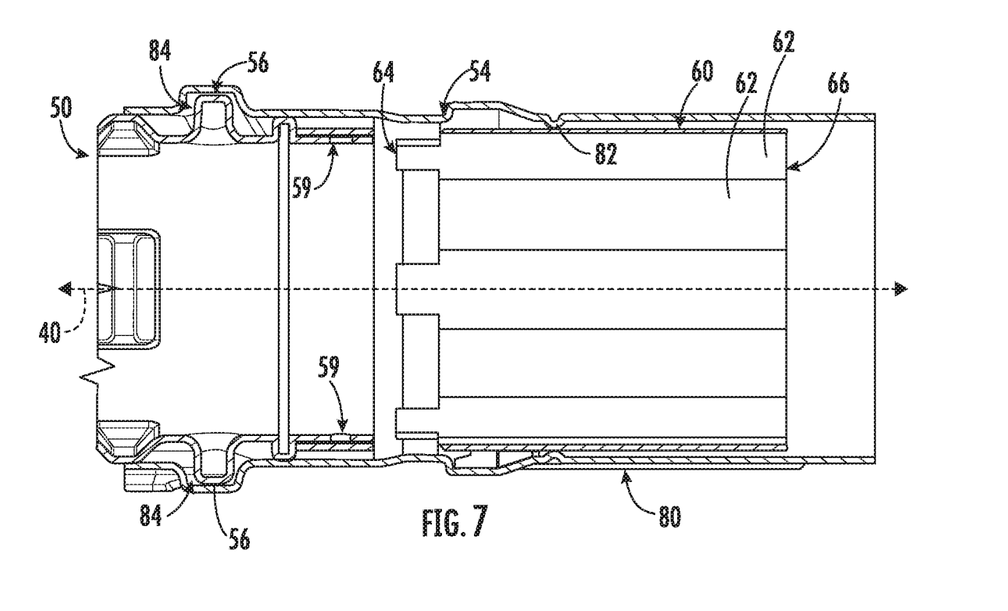
FIG. 7 is an assembled cross-sectional view of an extension tube, variable nozzle, and nozzle adjustment tube of a blower, illustrating posts of the extension tube seated in tracks of the nozzle adjustment tube, in accordance with embodiments of the present disclosure.
Figure 8:
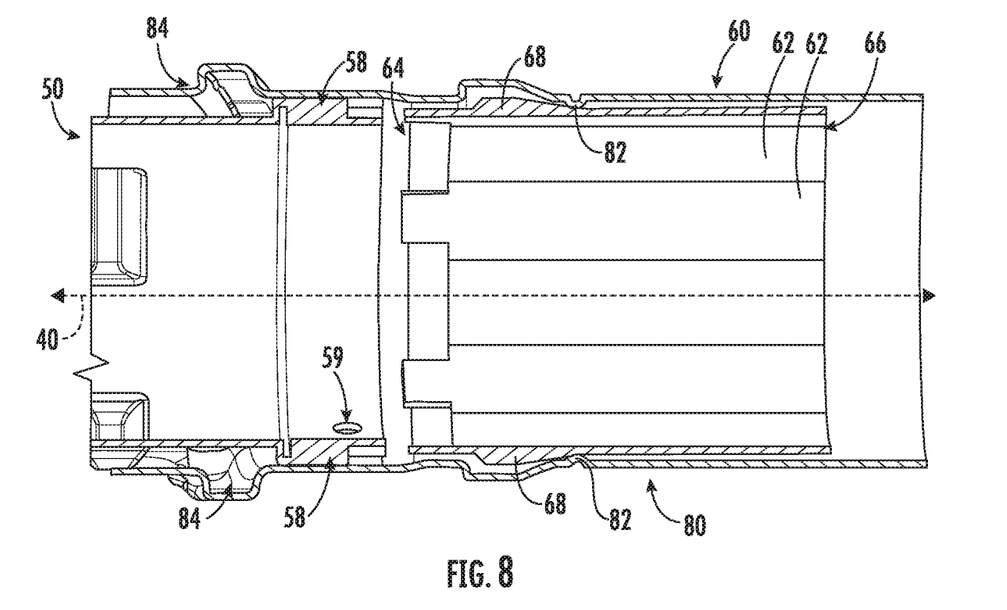
FIG. 8 is an assembled cross-sectional view of an extension tube, variable nozzle, and nozzle adjustment tube of a blower, with the variable nozzle in a first position, in accordance with embodiments of the present disclosure.

In some embodiments, the nozzle adjustment tube 80 may further include one or more interior tracks 84. Each interior track 84 may correspond to a post 56 of the extension tube 50. For example, a post 56 may be seated in a corresponding track 84 when the nozzle adjustment tube 80 is connected to the extension tube 50. The interaction of the post 56 in the corresponding track 84 may guide movement of the nozzle adjustment tube 80 relative to the extension tube 50.

For example, at least a portion 86 of the track 84 may be helical. Accordingly, as the nozzle adjustment tube 80 is rotated about the longitudinal axis 40 relative to the extension tube 50, movement of the post 56 in the helical portion 86 of the track 84 may cause the nozzle adjustment tube 80 to additionally move along the longitudinal axis 40. Thus, rotation of the nozzle adjustment tube 80 about the longitudinal axis 40 in these embodiments causes movement of the nozzle adjustment tube 80 along the longitudinal axis 40.

This movement about the longitudinal axis 40 may in turn cause interaction of the raised cam surface(s) 82 and raised cam surfaces 68, thus causing movement of the air control surfaces 62 between the first and second positions.

In some embodiments, raised stops 85 may be provided in the tracks 84, such as in the helical portion 86 thereof. The stops 85 may be spaced apart at predetermined increments along the track 84. Stops 85 may facilitate incremental adjustment of the nozzle adjustment tube 80, and thus incremental adjustment of the air control surfaces 62, as discussed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A blower, comprising:
   a main body comprising a housing and a fan disposed in the housing, the housing further defining an air discharge opening;
   an extension tube connected to the air discharge opening, the extension tube extending between a first end connected to the air discharge opening and a second end;
   a variable nozzle, the variable nozzle comprising a plurality of adjustable air control surfaces and a retaining ring, each of the plurality of air control surfaces connected to the retaining ring; and
   a nozzle adjustment tube connected to the second end of the extension tube and at least partially surrounding the variable nozzle,
   wherein rotation of the nozzle adjustment tube about a longitudinal axis causes movement of the air control surfaces between a first position and a second position.

2. The blower of claim 1, wherein each of the plurality of air control surfaces comprises an exterior raised cam surface, wherein the nozzle adjustment tube comprises one or more interior raised cam surfaces, and wherein movement of the one or more interior raised cam surfaces relative to the exterior raised cam surfaces causes the movement of the air control surfaces between the first position and the second position.

3. The blower of claim 2, wherein the movement is along the longitudinal axis.

4. The blower of claim 1, wherein the extension tube comprises an exterior post, and wherein the nozzle adjustment tube defines an interior track, the post seated in the track.

5. The blower of claim 4, wherein at least a portion of the track is helical.

6. The blower of claim 1, wherein rotation of the nozzle adjustment tube about the longitudinal axis causes movement of the nozzle adjustment tube along the longitudinal axis.

7. The blower of claim 1, wherein the plurality of air control surfaces are disposed in an annular array about the longitudinal axis.

8. The blower of claim 1, wherein at least one keyway is defined in the retaining ring, the at least one keyway mating with a corresponding key of the extension tube.

9. The blower of claim 1, wherein at least one lock member protrudes from the retaining ring, the at least one lock member mating with a corresponding lock aperture defined in the extension tube.

10. The blower of claim 1, wherein each of the plurality of air control surfaces is connected to the retaining ring by a leaf spring.

11. The blower of claim 1, wherein each of the plurality of air control surfaces is formed from a thermoplastic polymer.

12. A blower, comprising:
    a main body comprising a housing and a fan disposed in the housing, the housing further defining an air discharge opening;
    an extension tube connected to the air discharge opening, the extension tube extending between a first end connected to the air discharge opening and a second end;
    a variable nozzle, the variable nozzle comprising a plurality of adjustable air control surfaces, each of the plurality of air control surfaces comprises an exterior raised cam surface; and
    a nozzle adjustment tube connected to the second end of the extension tube and at least partially surrounding the variable nozzle, the nozzle adjustment tube comprising one or more interior raised cam surfaces,
    wherein movement of the one or more interior raised cam surfaces relative to the exterior raised cam surfaces along a longitudinal axis causes movement of the air control surfaces between a first position and the second position.

13. The blower of claim 12, wherein the extension tube comprises an exterior post, and wherein the nozzle adjustment tube defines an interior track, the post seated in the track.

14. The blower of claim 13, wherein at least a portion of the track is helical.

15. The blower of claim 12, wherein rotation of the nozzle adjustment tube about the longitudinal axis causes movement of the nozzle adjustment tube along the longitudinal axis.

16. The blower of claim 12, wherein the variable nozzle further comprises a retaining ring, each of the plurality of air control surfaces connected to the retaining ring.

17. The blower of claim 16, wherein at least one keyway is defined in the retaining ring, the at least one keyway mating with a corresponding key of the extension tube.

18. The blower of claim 16, wherein at least one lock member protrudes from the retaining ring, the at least one lock member mating with a corresponding lock aperture defined in the extension tube.

19. The blower of claim 16, wherein each of the plurality of air control surfaces is connected to the retaining ring by a leaf spring.

* * * * *